Figure 1:
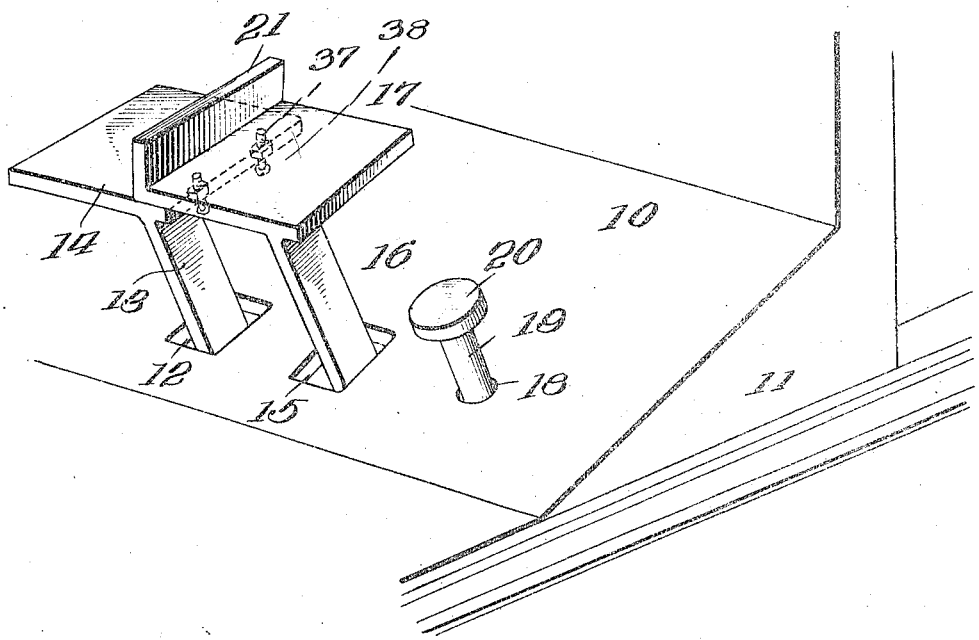

R. T. PEIRCE.
PEDAL CONTROL FOR AUTOMOBILES.
APPLICATION FILED MAY 15, 1914.

1,137,166.

Patented Apr. 27, 1915.
2 SHEETS—SHEET 1.

Witnesses
W. A. Williams
U. W. Woodman

Inventor
R. T. Peirce

By
Harvey, Attorneys

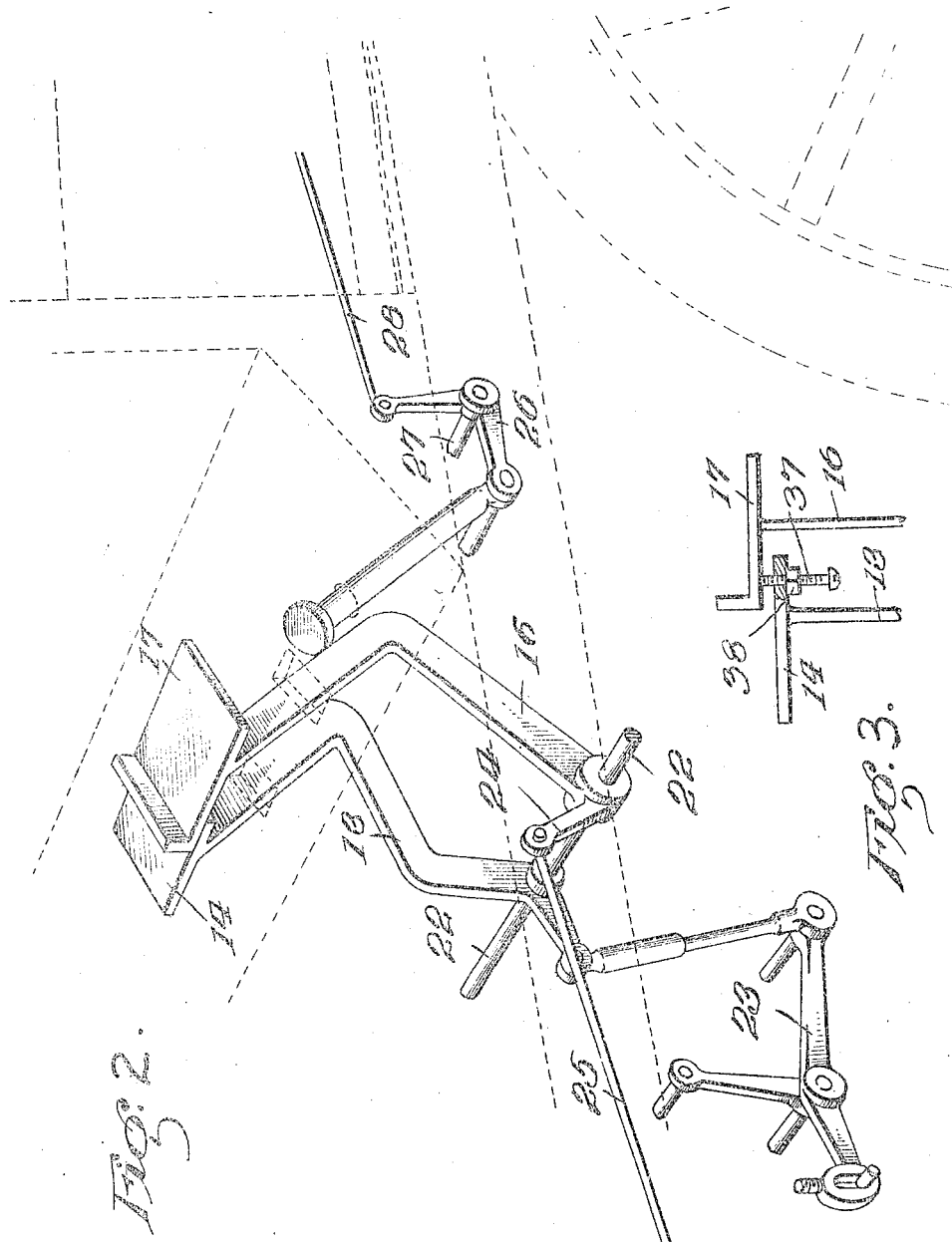

UNITED STATES PATENT OFFICE.

ROBERT T. PEIRCE, OF NEWPORT NEWS, VIRGINIA.

PEDAL CONTROL FOR AUTOMOBILES.

1,137,166.  Specification of Letters Patent.  Patented Apr. 27, 1915.

Application filed May 15, 1914.  Serial No. 838,799.

*To all whom it may concern:*

Be it known that I, ROBERT T. PEIRCE, citizen of the United States, residing at Newport News, in the county of Warwick and State of Virginia, have invented certain new and useful Improvements in Pedal Control for Automobiles, of which the following is a specification.

My invention relates to new and useful improvements in control mechanisms for self-propelled vehicles of the gasolene type, the primary object of my invention being the construction of co-acting clutch and brake pedals in such a manner that while the clutch pedal may be independently operated, pressure applied to the brake pedal, to apply the brakes, will also operate the clutch pedal to release the clutch. The importance of this will be readily understood in view of the fact that brakes should never be applied without first releasing the clutch. Furthermore, it is oftentimes desirable to operate the foot controlled throttle lever or accelerator pedal immediately after application of the brakes and as the clutch pedal is being gradually released. It is therefore necessary, at times, to operate three pedals almost simultaneously which is practically impossible if all of the pedals are separately operated. With my invention it is possible to operate the accelerator pedal with one foot while the brake and clutch pedals are simultaneously operated with the other.

A still further object of my invention is to accomplish the above result without in any way changing the structure of either the brake or clutch operating mechanism itself.

With these and other objects in view, my invention will be more fully described, illustrated in the accompanying drawings, and then specifically pointed out in the claims which are attached to and form a part of this application.

In the drawings:—Figure 1 is a fragmentary perspective view showing one method of operating the clutch pedal by operation of the brake pedal; Fig. 2 is a fragmentary perspective view of the form of mechanism shown in Fig. 1, showing the connections between the brake, clutch and accelerator pedals and the brake, clutch and accelerator mechanisms. Fig. 3 is a fragmentary front elevation, partially in section of the form of pedal mechanism shown in Fig. 1, illustrating the adjustment mechanism.

Corresponding and like parts are referred to in the following description and indicated in all the views of the drawings by the same reference characters.

In the drawings, 10 indicates the foot board of a conventional motor vehicle 11, this foot board being slotted at 12 for the passage of the shank 13 of the clutch pedal 14 and further slotted at 15 for the passage of the shank portion 16 of the brake pedal 17. The foot board is further apertured at 18 for movement of the shank 19 of the foot controlled throttle lever or accelerator pedal 20, this accelerator pedal being shown merely to bring out the advantage in the clutch and brake pedal structure.

As clearly shown in Fig. 1, the foot pieces of the clutch and brake pedals 14 and 17 are so formed that the latter overlaps a portion of the former, whereby any pressure exerted against the brake pedal 17 will also be applied to the clutch pedal 14. In order to prevent any possibility of the operator's foot slipping on the brake pedal, when only the clutch pedal is to be used, that edge of the brake pedal overlapping the clutch pedal is provided with an upstanding flange or shoulder 21.

As best shown in Fig. 2 of the drawings, the shank 13 of the clutch pedal 14 is pivoted adjacent its lower end upon a transverse shaft 22 and its lower end pivotally connected to the operating mechanism of the clutch, which mechanism is indicated as a whole by the numeral 23. As this clutch operating mechanism is of conventional type and as it forms no part of the present invention, any detail description is unnecessary. In like manner, the shank portion 16 of the brake pedal 17 is pivoted upon the shaft 22 and provided at its free end with an upstanding arm 24 to which is pivotally connected the brake rod 25. The accelerator pedal is pivotally connected at its lower end to a bell crank lever 26 mounted upon a shaft 27 and operatively connected by its free arm to a throttle control rod 28 leading to the carbureter.

The above description, taken in connection with Figs. 1 and 2 of the drawings, will clearly disclose the operation of my control mechanism. It will be clear that pressure exerted directly upon the clutch pedal 14 will free the clutch in the usual manner without in any way affecting the brake pedal 17. On the other hand, pressure applied to the brake pedal 17 will also be applied to the clutch pedal 14 with the result that the clutch will be simultaneously released upon application of the brakes. For this reason it is possible to press down upon the accelerator pedal at the same time the brakes are being released and the clutch let in, an operation which is highly desirable, and which cannot be accomplished with control mechanisms now in use.

Although I have illustrated and described my invention in all its details, it will of course be understood that I do not wish to be limited to such details as any changes, within the scope of the appended claims, may be made at any time without in the slightest degree departing from the spirit of my invention. Furthermore, I do not wish to limit myself to the application of co-acting pedals in a self-propelled vehicle control mechanism as I reserve the right to employ either of the above described mechanisms for other purposes than that of controlling automobiles.

In many cases it may be found advisable to provide for relative adjustment between the clutch and brake pedals and such adjustment is shown in dotted lines in Fig. 1 and in detail in Fig. 3. This adjustment comprises one or more adjusting screws 37 which are threaded upwardly through that portion of the clutch pedal foot piece overlapped by the foot piece of the brake pedal to engage against the under face of the brake pedal, these adjusting screws being secured in adjusted position by lock nuts 38. As will be readily understood, proper setting of these adjusting screws will take up any independent movement of the pedals, other than that desired.

Having thus described the invention, what is claimed as new is:

1. In a self-propelled vehicle, the combination with a clutch operating mechanism and a brake operating mechanism, of a clutch pedal and a brake pedal operatively connected to such mechanisms and each having a foot piece, the foot piece of the brake pedal partially overlapping the foot piece of the clutch pedal, that edge of the foot piece of the brake pedal overlapping the foot piece of the clutch pedal having an upstanding flange.

2. In a self-propelled vehicle, the combination with a clutch pedal and a brake pedal, of a foot piece carried by the clutch pedal, a second foot piece carried by the brake pedal and bridging the space between the pedals, one edge of the second foot piece overlapping the adjacent edge of the other foot piece, such edges being co-extensive, and an upstanding flange formed upon the overlapping edge of the second foot piece to prevent slipping of the foot from either foot piece onto the other.

In testimony whereof I affix my signature in presence of two witnesses.

ROBERT T. PEIRCE. [L. S.]

Witnesses:
 ELBERT NEASEN,
 JAMES A. WHITE.